Nov. 22, 1966 H. GERMER 3,287,736
RADIATION TYPING APPARATUS
Filed Oct. 26, 1964

INVENTOR

United States Patent Office 3,287,736
Patented Nov. 22, 1966

3,287,736

RADIATION TYPING APPARATUS

Horst Germer, 13 Aegidienmarkt, Braunschweig, Germany

Filed Oct. 26, 1964, Ser. No. 407,617
Claims priority, application Germany, Nov. 4, 1963, G 39,173
24 Claims. (Cl. 346—74)

Figure 1:
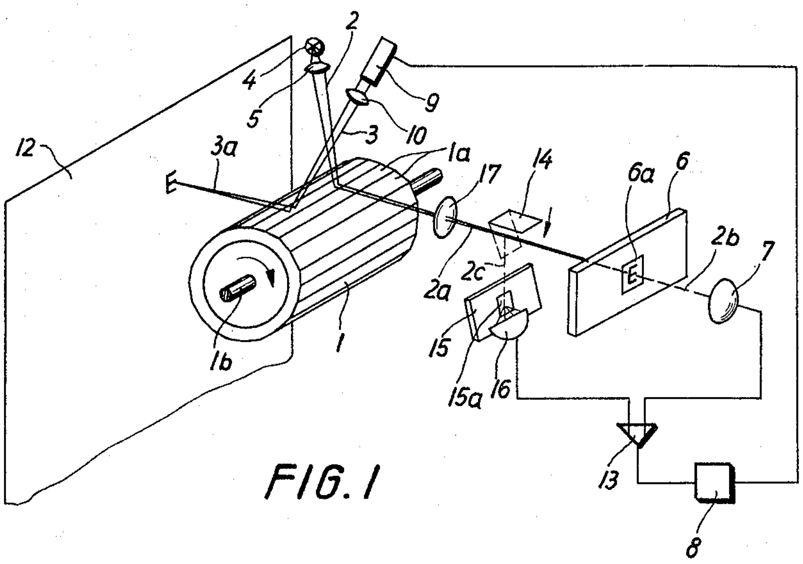

This invention relates to a means for recording type characters by a deflectable focusable beam whose intensity is controllable, and cooperates with means already suggested, to produce directly visible recordings.

Especially in connection with xerographical recordings, means are known which by means of a beam of light or a cathode ray produce on an intermediate carrier a virtual electric charge image which is caused to be visible in subsequent operations, transferred unto a record sheet, and fixed thereon.

The disadvantages of the means operating with such recording method are known. They are due primarily to the cumbersome succession of several individual operations which require relatively expensive instruments and will limit the recording speed. In many cases another disadvantage is that the characters are not immediately visible in the instance of the recording, and thereby permit a speedy correction.

Other suggested recording devices operate with a high-power and perhaps coherent beam which in cooperation with selectable masks permits the direct recoding without any intermediate operations. But this system leads to a certain loss of energy at the respectively covering portions of the mask which may be undesirable in some instances where a high-power radiation is being used.

So there have been suggested also recording methods using high-power rays, with the recording ray being deflected in a raster-type manner, and the intensity thereof being modulated at the same time by voltages which are taken from a record adapted to be scanned or contacted for instance magnetically. Although these arrangements avoid the mentioned loss of energy, they are less suited for individual machines, but substantially for a system including numerous typing places and a decentralised storage of characters.

The present invention is to fill the existing gap that the disadvantages and limitations of the mentioned systems will be avoided also in individual typewriters. In addition, its additional function is to permit the insertion of any desired recording sections not comprised in a mask storage, for instance handwritten characters, words, parts of sentences, mathematical representations, chemical formulae and the like in a text typed by the machine.

It accomplished these objects by the use of a first relatively low-power focused beam for scanning selectable masks or an insertion field, and a second relatively high-power beam which is also focused and whose intensity is controlled by the scanning values of that first beam and which in cooperation with a suggested recording device will perform the recording of the scanned character directly in the particular typing position. It provides for the deflection of the scanning and recording beams being made primarily by the same deflection system and for the scanning beam being adapted to be adjusted by a deflecting member to a mask to be scanned or to an insertion field to be scanned. For the scanning beam, a scanning may be provided also of the mask or insertion image reflected at the deflection system, by an image probe known per se.

Substantially then, the invention is characterised by the fact that a means such as a focused, relatively low-power first beam scanning in raster-type manner the character pattern such as a mask or an insertion field adapted to be turned on in its place, and a second, relatively high-energy beam primarily deflected by the same deflecting means synchronous and in phase with the first scanning means, are provided, and that voltages caused by the first beam in a light-sensitive element such as a photocell and corresponding to the scanning value, are operative as control voltages for the intensity control of the recording second beam.

It may be provided in another formation of the invention that selectively a deflecting mirror can be pivoted into the path of the scanning first beam, with an insertion area being scanned as said mirror is being turned on, by the scanning beam or in an equivalent manner an image probe in place of one of the selectable masks.

Further, there may be connected into the recording second beam optics such as a mirror device which serves to change the length of the path of rays, and permits a selective adjustment of the desired size of the recorded character by readjustment of at least one optical element such as a mirror.

Figure 2:
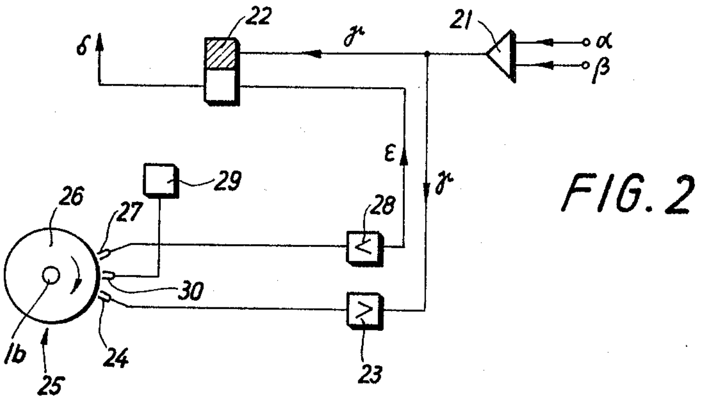
Figure 3:
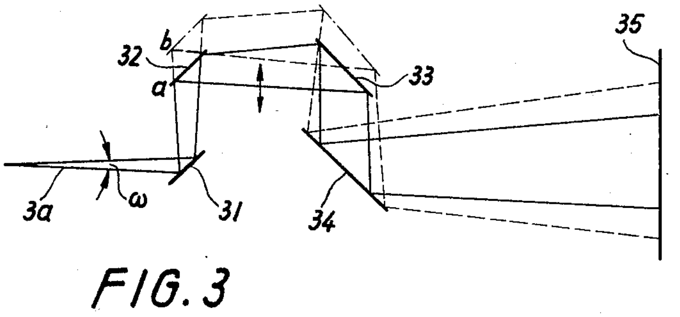

Other details of the invention will become clear from the following specification in connection with the illustrations in the drawings wherein:

FIG. 1 shows a schematic illustration of the scanning and recording devices including a switching mirror, FIG. 2 a circuit example for the control of the scanning operations, FIG. 3 an example of the mirror assembly adapted to be connected into the recording beam and serving to magnify or reduce the character to be recorded.

In the schematic embodiment of FIG. 1, there is provided as a joint deflecting unit for scanning beam 2 and for recording beam 5 a mirror wheel 1 known per se whose mirror faces 1*a* are inclined from axes $1_b$ from face to face by an increasing angular amount. By the mirror faces succeeding each other as the mirror wheel is rotated, the relatively low-power beam 2 coming from light source 4 and focused by means of optics 5 is deflected so that it will scan one of masks 6*a* of mask carrier 6 selectable from a keyboard, line by line, passing through the same or being stopped by an opaque element of the pattern. Scanning ray $2_b$ affected at that time by the mask, will control a light-electric element such as a photocell 7 whose output voltages will be received by amplifier 8. The output voltages of the amplifier are operative across radiation generator 9 in the form of control voltages, and determine the particular intensity of recording beam 3. The intensity control can be effected in known manner by a Kerr cell, a crystal having an electrically controllable index of deflection, by directly electrically influencing a semiconductor-Laser or in some other manner.

Upon being focused in optics 10, the relatively high-power recording beam 3 strikes upon the same mirror face 1*a* mirror wheel 1 as does scanning beam 2. It will be deflected therefore in the same manner as the latter is being deflected, and will record the values corresponding to the output voltages of photocell 7 by the effect of the reflected beam 3*a* on recording surface 12, for instance a sheet of paper.

In the selected illustration of the example, the impinging points of beams 2 and 3 on mirror surface 1*a* have been drawn in space relationship for clarity. For readily apparent reasons of geometry, it is useful in the practical embodiment to have both beams impinge on the mirror surface in the same point, and arrange for this point to be the pivotal point for the different inclination of the successively following mirror surfaces.

This results in the deflected beams, notwithstanding the different inclination angle of the mirrors, always scanning the same level of the mask or the recording field.

Of course, it is conceivable to provide for each of the two beams 2 and 3, on a common axis of rotation, an individual system of mirror surfaces whose positions correspond with each other in accordance with the conditions.

In the path of scanning beam 2*a* reflected by the mirror wheel, a deflecting mirror 14 is arranged to be turnable, which is adapted to be turned out of the drawn-out position in the direction of the arrow into the dashed position by means not shown, e.g. a keyboard-controlled electromagnet.

So if this deflecting mirror is turned on reflected scanning beam 2*c* will strike upon the insertion field 15*a* which may be formed for instance as a white area to be written upon by a writing stylus and if required can be illuminated during the scanning operation. The covering may be insured also in a manner so that the inserting field is mounted on a machine part 15 adapted to be turned out or extended, which for the recording of an insertion by hand, e.g. by actuating an insertion key, is taken into a writing-inclined position, and following the manual insertion, is returned into the covered scanning position.

From the writing surface, the beam mostly reflected in a diffused manner, is going to a second photocell 16 whose output voltages also are operative across amplifier 8 through an OR-circuit. To the extent that the characters to be scanned, or masks 6 and those of insertion field 15*a* appear as dark lines on a bright background, amplifier 8 must be formed as phase reversing amplifier in order for recording beam 3 being controlled fully in respectively one scanned dark raster element.

But if the mask characters are shown as white lines on a dark background while the insertion field is being lettered with dark lines, a separate phase-reversing member is to be connected between photocell 16 and the input of a standard amplifier 8.

The operation of the assembly is as follows:

Assuming that the mirror wheel is provided with fifteen mirror surfaces mounted on the periphery in the manner described above. In that event, as deflecting mirror 14 is in the idle position, scanning beam 2*a* is scanning the connected diamask 6*a* of mask carrier 6 in fifteen vertical lines as said mirror wheel rotates once. Assuming further that a character is to be printed in $\frac{1}{50}$ second, a number of rotation of *n*–3000 is to be provided for the mirror wheel. Of course, it is readily possible to increase the number of the mirror surfaces on the periphery of the mirror wheel and achieve a number of for instance *n*–750 or less in the event of for instance four mirror groups i.e. 60 mirror surfaces. It must be insured that following each scanning of a complete character, i.e. of a mask or the insertion field, the scanning operation is being turned off until a new mask is selected, and the shifting step of the machine ended.

How this can be ensured in a simple manner will be explained in detail below.

The mirror wheel itself can be made of a synthetic material for instance and may be provided with a reflecting metal coat of chromium or the like. The accuracy thus achieved is completely sufficient to produce a raster image corresponding to a good typewriter print.

In displaying the mask characters as transparent or reflecting character surfaces, the scanning pulses received by photocell 7 are amplified directly and address the radiation generator so that when a character value of the mask occurs, beam 3 will be controlled out completely, and cause a visible character element on recording surface 12. If on the other hand deflecting mirror 14 is turned on, reflected beam 2*c* will scan writing surface 15. Since in the selected example, the latter is to be lettered with dark lines, scanning values will not occur except when a point of the image negative is being scanned. For this reason, the mentioned phase reversing member must be connected ahead of said amplifier, whereby in turn recording beam 3 will be controlled out fully in the event of a scanned character value.

FIGURE 2 shows an exemplified circuit for the properly timed scanning and recording operations. In this FIGURE, 21 is an AND-circuit at whose inputs potentials $\alpha$ and $\beta$ can occur.

Potential $\alpha$ occurs when the shifting step of the machine is completed. Its production will not be explained more fully, since such position circuits are common knowledge in the art of business machines.

Potential $\beta$ will occur when the mask selection is completed or when deflecting mirror 14 has been adjusted into its dashed end position. The nature of the generation of this potential also requires no detailed explanation, since it is included in the knowledge of those skilled in the art to accomplish such conditions in circuitry.

If both potentials exist at the same time, potential $\delta$ is across the output of AND-circuit 21, which will switch bistable switching element 22 into the drawn position.

In addition, a pulse is recorded on a magnetic track $\beta$ which can be arranged on a free portion of said mirror wheel, through amplifier 23 and magnetic head 24, as potential $\gamma$ occurs.

By bistable switching element 22 being shifted, there will be caused at the output thereof, potential $\delta$ as the order: "Scan" which for example will open two photocells 7 and 16 in known manner, and thereby will initiate the processing of the scanned data.

After almost a complete revolution, the recorded pulse $\gamma$ will appear at the pickup head 27 and thus as a pulse at the input of amplifier 28. The small adjustable distance of heads 24 and 27 corresponds here to the delay caused by the time constant of switching members 24, 27, 28, so that output pulse $\epsilon$ again will turn off potential $\delta$ exactly following one revolution of said mirror wheel, counting from the time of the opening of the photocells, i.e. following a complete character scanning. Conveniently, at least one of heads 24 and 27 is provided with means for correcting the position.

In order to erase the pulse $\gamma$ registered by head 27, there is provided between heads 24 and 27 an erasing head 30 which is connected to high-frequency generator 29 and exerts a constant erasing action on track 26 so that as the revolution of the magnetic head is repeated a pulse recorded by head 24 can appear only once at pickup head 27.

In order to avoid high-frequency generator 29, an elementary known arrangement including a permanent erasing magnet and a magnetically biased pickup head may be employed.

Due to this technically rather simple control device, the scanning operation can begin in any desired position of the mirror wheel. Once a mask has been selected on the keyboard therefore, the scanning and the recording may begin at once without any waiting period. It is not important here if a character, in accordance with the accidental position of the mirror wheel, beginning perhaps at a desired raster line, is recorded first on one side and subsequently on the other side of this line. The important thing is, however, that immediately upon the recording of the last raster line, the means will be available for a fresh recording when the switching step and the new mask selection have been completed.

The described control means is applicable without any basic changes of the system in the event also that in order to reduce the number of rotations of the mirror wheel in the sense mentioned above, several groups of mirrors are arranged in succession on the periphery of the mirror wheel. It is convenient, however, to apply magnetic track 26 to a drum positioned to be separately rotatable, and connect between mirror wheel 1 and said drum a gear transmission whose transmission ratio is determined by the number of the mirror groups. Thereby, a set of magnetic heads 24, 27, 30 is sufficient also in this instance, which furthermore, with the possibility of adjustment being retained, constructively may be combined in known manner to form a combination head.

In order to modulate the characters to be recorded as the size of the scanned pattern characters remains constant, an adjustable optical additional device can be connected into the path of rays of the recording beam 3. As shown in FIGURE 3, the optics may consist for instance of four mirrors 31 to 34, of which 32 and 33 are mounted to be displacable in the indicated arrow direction. As maximum angle of deflection $\omega$ of recording beam 3 remains constant, the adjustment of these two mirrors from a lower plane *a* toward an upper plane *b* will achieve a magnification of the characters projected unto surface 35.

In order for the shifting step to be adapted automatically to the new character width along with the modification with the character size, the displacement of mirrors 32 and 33 may be effected for instance in four steps. In doing so, the displacement mechanism simultaneously can influence an indexing mechanism and adapt the width of the indexing or shifting step to the character width in known manner. This permits typing by the means described, selectively in four type sizes, i.e. for instance emphasizing particular passages in italics, or distinguishing or emphasizing headlines and subtitles by appropriate sizes of type.

With the arrangement described, a display of the character in a raster comprising for instance 225 elements, is possible readily. Such rastering results in an excellent representation as is commensurate with a good typewriter print. It meets all requirements therefore. Generally, a substantially coarser rastering will be completely sufficient for many purposes such as teletyping, whereby of course the quality of the scanning and recording means can be simplified substantially.

On the other hand it is possible without any fundamental difficulties to increase the number of the raster elements so that for example in the event of 20 scanning characters, there will be a rastering including 400 elements, which will meet even maximum requirements.

Of course, the means shown as an example permits numerous variations. So the use of course is permitted of masks with a reflecting pattern and/or a light permeable recording surface 15 (transparent paper or the like) without changing the essence of the invention.

In particular instances, the scanning beam and its associated light source 4 can be replaced by an image probe known per se which is connected between the model image reflected by the mirror wheel, and a photocell.

Further, a form of the means is conceivable wherein a single photocell is sufficient for scanning beams 2*a* and 2*b*. Moreover, insertion field 15 may be formed if necessary as a paper tape adapted to be indexed by a key and on which there can be written by hand, words, sentences, formulae, or the like, and can be inserted into the typed text by the repeated operation of the insertion key. The repeated indexing of the tape may be released also by a longer depressing of the insertion key by means known per se automatically.

Like the tap to be written on by hand, a teletype tape, a passage cut in strips of an appropriate width, or the like can be introduced into the insertion field and thereby taken over into the machine head.

Any further application of the preceding insertion system to an arrangement for inserting drawings into a machine text will not offer any fundamental difficulty to those skilled in the art, if they provide instead of the strip indexable in the line direction, a support for a drawing subject or the like indexable in two coordinates. By means of such device then, addresses and other similar insertions can be copied any time from simple copying sheets, filing cards or the like.

It is obvious to project such subjects by an optical supplementing means, unto insertion field 15*a*, either reduced or magnified, and thereby insert them into the machine text at a desired scale.

Finally, it is possible to use two equal machines of the invention instead of a copying device for copying texts, drawings or the like. It may be provided that the scanning beam of the receiving machine, as the typing beam is turned off, is displaceable together with the lighting and deflecting means and the photocell assembly so that the raster scanning will be effected in the typing position normally controlled by the writing beam. In that event, the sheet to be displayed can be fastened in that machine in the normal manner.

On the other hand, if the scanning beam is turned off, the writing beam of the recording machine will remain in its normal position. In such use of the machines, the deflecting systems of both machines are adapted rigidly to be coupled together either electrically or mechanically, e.g. by an intermediate shaft adapted to be plugged and perhaps being flexible. In order for the shifting or indexing steps, the line advance, etc., to be performed simultaneously, the electrical control members can be interconnected correspondingly.

If two or more machines are to be available continuously selectively for producing copies, it is not necessary for such secondary machines to be equipped as completely as the main machine. Rather, these machines may be without the following units: Keyboard, mask assembly, scanning and inserting arrangement including photocells and amplifiers. Accordingly, they are provided substantially with a writing or typing system and a synchronised deflecting system, and receive all recording data in the form of control voltages from the main machine. But in addition, they suitably may be provided with a paper supply roll in order not having to put in the respective sheets. By actuating a cutting device, each completed copy may be removed so that immediately thereafter, the machine may be available again for another copying operation.

In an electrical remote synchronising of the deflecting systems, two machines may be used in this manner for the signature and check controls between remote places of work so that special machines are not required therefor either.

What I claim is:

1. Radiation typing apparatus comprising, in combination, a first radiation source producing a first beam; scanning means impinged by said first beam and operable for moving said first beam in a scanning movement; a pattern located in the path of said first beam following said scanning means so as to be scanned by said first beam; photoelectric sensing means located in said path of said first beam behind said pattern for producing successive impulses representing the scanned pattern; a second radiation source producing a second beam of a different radiation, and being controlled by said impulses so that the intensity of said second beam varies to represent scanned elements of the scanned pattern, said second radiation source being disposed so that said second beam impinges said scanning means and is moved by the same in a scanning movement synchronized with the scanning movement of said first beam and adapted to scan a writing surface responsive to the varying intensity of said different radiation of said second beam to receive an image of the scanned pattern.

2. Apparatus according to claim 1 wherein said scanning means includes a rotary mirron having a plurality of facets for producing scanning movements of said first and second beams, said facets extending at different angles to the axis of rotation of said rotary mirror, and each said facet being simuletaneously impinged by said first and second beams.

3. Apparatus according to claim 1 including means for deflecting said first beam to scan said surface so that a text mounted on said surface is reproduced on said surface.

4. Apparatus according to claim 1 including another radiation typing apparatus as set forth in claim 1, and including means for connecting said two radiation typing apparatus for simultaneous operation.

5. Apparatus according to claim 1 and including a second scanning means, and a third source of radiation producing a third beam moved in a scanning movement by said second scanning means over another writing surface; and means for supplying said impulses to said third source of radiation so that the intensity of the same varies to represent the scanned elements of said pattern.

6. Apparatus according to claim 1 and including optical means in the path of said second beam for enlarging the reproduction of said pattern on said writing surface.

7. Apparatus according to claim 6 wherein said optical means include adjustable mirror means for deflecting said second beam along a U-shaped path.

8. Apparatus according to claim 1 wherein said scanning means includes a rotary mirror having a plurality of facets for producing scanning movements of said first and second beams.

9. Apparatus according to claim 1 and including adjustable optical means in the path of said second beam for enlarging the reproduction of said pattern on said writing surface and adapted to be connected with means for varying the steps of a typewriter mechanism so that the enlargement of the pattern corresponds to the length of the step.

10. Apparatus according to claim 8 wherein said insertion field is part of a movable paper band.

11. Apparatus according to claim 10 and including transporting means for said paper band; and means for actuating said transporting means.

12. Apparatus according to claim 11 wherein said actuating means include a key, and means for automatically operating said transporting means during actuation of said key.

13. Apparatus according to claim 11, wherein said transporting means are operable in two perpendicular directions.

14. Radiation typing apparatus comprising, in combination, a first radiation source producing a first beam; scanning means impinged by said first beam and operable for moving said first beam in a scanning movement; a first pattern located in the path of said first beam following said scanning means so as to be scanned by said first beam; photoelectric sensing means located in said path of said first beam behind said first pattern for producing successive impulses representing the scanned pattern; a second radiation source producing a second beam of a different radiation, and being controlled by said impulses so that the intensity of said second beam varies to represent scanned elements of the scanned pattern, said second radiation source being disposed so that said second beam impinges said scanning means and is moved by the same in a scanning movement synchronized with the scanning movement of said first beam and adapted to scan a writing surface responsive to the varying intensity of said different radiation of said second beam to receive an image of the scanned pattern; an insertion field adapted to have a second pattern to be inserted; deflecting means located in the path of said first beam between said scanning means and said first pattern, and having an inoperative position, and a deflecting position for deflecting said first beam onto said inserting field so that said second pattern is scanned; and other photoelectric sensing means located behind said second pattern in the deflecting path of said first beam for producing successive impulses representing said second pattern and being connected with said second radiation source for varying the intensity of said second beam in accordance with the impulses produced by said other photoelectric sensing means whereby an image of said second pattern is formed on said writing surface and an insertion can be made.

15. Apparatus according to claim 14 wherein said deflecting means include a mirror movable between an inoperative position located outside of said first beam, and a deflecting position disposed at an angle to said first beam for deflecting the same.

16. Apparatus according to claim 14 including an AND-gate for receiving a first potential at the end of a scanning operation, and a second potential at a change of said first and second patterns, said AND-gate producing a third potential controlling the start of a scanning operation.

17. Apparatus according to claim 14 wherein said insertion field is part of a member movable between an operative position adapted to be scanned, and an inoperative position for the recording of an insert.

18. Apparatus according to claim 14 including an AND-gate for receiving a first potential at the end of a scanning operation, and a second potential at a change of said first and second patterns, said AND-gate producing a third potential; and a bistable switching element receiving said third potential for producing a fourth potential for starting a scanning operation of said scanning means.

19. Apparatus according to claim 18 including a magnetic recording head receiving said fourth potential for recording the same on a record carrier; means for transporting said record carrier; and a pickup head for producing a signal when reading out said recorded fourth potential after a predetermined movement of said transporting means, and supplying said signal to said switching element to reset the same.

20. Apparatus according to claim 19 and including an erasing head between said recording head and said pickup head.

21. Apparatus according to claim 19 wherein said scanning means is a rotary mirror having a plurality of reflecting facets about the periphery thereof; and wherein said transporting means is connected with said rotary mirror and forms a unit with the same.

22. Apparatus according to claim 19 wherein said scanning means includes a plurality of drum-shaped rotary mirrors each mirror having a plurality of facets; and including transmission means connecting said mirrors with said transporting means and having a transmission ratio equal to the number of mirrors.

23. Apparatus according to claim 14 including means for projecting a text to be copied onto said insertion field to serve as a second pattern.

24. Apparatus according to claim 23 and including means for magnifying or reducing the image projected on said insertion field.

References Cited by the Examiner

UNITED STATES PATENTS 1,649,819 11/1927 Fell ---------------- 178—6

TERRELL W. FEARS, *Acting Primary Examiner.*

IRVING SRAGOW, *Examiner.*

A. I. NEUSTADT, *Assistant Examiner.*